United States Patent
Kahn et al.

(10) Patent No.: US 10,075,365 B2
(45) Date of Patent: Sep. 11, 2018

(54) NETWORK PATH SELECTION IN POLICY-BASED NETWORKS USING ROUTING ENGINE

(71) Applicant: Raytheon Company, Waltham, MA (US)

(72) Inventors: Matt A. Kahn, Marlborough, MA (US); Steve Davidson, Acton, MA (US); Mark W. Henry, Wellesley, MA (US); Gregory S. Schrecke, Upton, MA (US); Mu-Cheng Wang, Acton, MA (US)

(73) Assignee: Raytheon Company, Waltham, MA (US)

( * ) Notice: Subject to any disclaimer, the term of this patent is extended or adjusted under 35 U.S.C. 154(b) by 240 days.

(21) Appl. No.: 14/469,849

(22) Filed: Aug. 27, 2014

(65) Prior Publication Data
US 2016/0065447 A1 Mar. 3, 2016

(51) Int. Cl.
*H04L 12/707* (2013.01)
*H04W 72/04* (2009.01)
(Continued)

(52) U.S. Cl.
CPC .............. *H04L 45/22* (2013.01); *H04L 47/20* (2013.01); *H04L 47/22* (2013.01);
(Continued)

(58) Field of Classification Search
CPC . H04L 45/302; H04L 61/1552; H04L 61/255; H04L 12/5689; H04L 49/25;
(Continued)

(56) References Cited

U.S. PATENT DOCUMENTS 5,953,312 A * 9/1999 Crawley ................. H04L 45/08
370/218
8,165,121 B1 4/2012 Singh
(Continued)

FOREIGN PATENT DOCUMENTS

EP 2041930 B1 7/2012
EP 2252015 B1 9/2012
(Continued)

OTHER PUBLICATIONS

"International Application Serial No. PCT/US2015/036335, International Search Report dated Aug. 25, 2015", 3 pgs.
(Continued)

*Primary Examiner* — Salvador E Rivas
(74) *Attorney, Agent, or Firm* — Schwegman Lundberg & Woessner, P.A.

(57) ABSTRACT

In one embodiment, a method includes receiving a data packet at a routing engine of a node of a network. A route is selected, from a forwarding table of the node, for sending the data packet from the node to a destination of the data packet. The forwarding table includes route characteristics, including route costs, related to two or more routes from the node to the destination. The selected route is analyzed, by a hardware computing device, to determine whether the selected route is suitable to convey the data packet based on real-time traffic information. The data packet is returned to the routing engine if the selected route is determined unsuitable to convey the data packet. An alternate route is selected, from the forwarding table, for the data packet in place of the previous selected route if the previous selected route is unsuitable to convey the data packet.

26 Claims, 3 Drawing Sheets

(51) Int. Cl.
*H04W 40/00* (2009.01)
*H04L 12/813* (2013.01)
*H04L 12/815* (2013.01)
*H04L 12/853* (2013.01)
*H04L 12/859* (2013.01)
*H04L 12/823* (2013.01)

(52) U.S. Cl.
CPC ...... *H04L 47/2416* (2013.01); *H04L 47/2475* (2013.01); *H04L 47/32* (2013.01); *H04W 40/00* (2013.01); *H04W 72/0493* (2013.01)

(58) Field of Classification Search
CPC ............... H04L 12/244; H04B 7/18584; H04J 14/0271; H04W 40/00; H04W 40/02; H04W 72/0493
See application file for complete search history.

(56) References Cited

U.S. PATENT DOCUMENTS

| | | | |
|---|---|---|---|
| 8,547,830 | B2 | 10/2013 | Taylor et al. |
| 2003/0086422 | A1 | 5/2003 | Klinker et al. |
| 2011/0110225 | A1* | 5/2011 | Mihaly ............... H04L 12/5692 370/225 |
| 2012/0113810 | A1* | 5/2012 | Brown ................ H04L 41/5029 370/238 |
| 2012/0207016 | A1* | 8/2012 | Wittenschlaeger ...... H04B 7/19 370/225 |
| 2014/0211630 | A1* | 7/2014 | Cavanna ................ H04L 49/25 370/235 |

FOREIGN PATENT DOCUMENTS

| | | |
|---|---|---|
| JP | 2004236050 A | 8/2004 |
| WO | 0167685 A2 | 9/2001 |
| WO | 2011066043 A1 | 6/2011 |
| WO | 2013071993 A1 | 5/2013 |
| WO | WO-2016032599 A1 | 3/2016 |

OTHER PUBLICATIONS

"International Application Serial No. PCT/US2015/036335, Written Opinion dated Aug. 25, 2015", 5 pgs.
"International Application Serial No. PCT/US2015/036335, International Preliminary Report on Patentability dated Mar. 9, 2017", 7 pgs.
"European Application Serial No. 15735783.1, Communication Pursuant to Article 94(3) EPC dated Sep. 20, 2017", 5 pgs.
"European Application Serial No. 15735783.1, Response filed Jan. 19, 2018 to Communication Pursuant to Article 94(3) EPC dated Sep. 20, 2017", 25 pgs.
"Japanese Application Serial No. 2017-510875, Office Action dated May 8, 2018", w/ English translation, 13 pgs.

* cited by examiner

NETWORK PATH SELECTION IN POLICY-BASED NETWORKS USING ROUTING ENGINE

BACKGROUND

The present disclosure relates to networking and, more particularly, to improved network utilization in policy-based networks where such networks may be dynamic.

Policy-routed networks with multiple paths between a source and a destination are generally not optimized to take advantage of those multiple paths, artificially reducing the throughput of the network, particularly in situations where topology and link quality vary over time. If a link is saturated for a given quality of service (QoS) level or differentiated services code point (DSCP) value, additional traffic is dropped even if a suitable alternate path is available. In dropping data, critical information may be lost or time-sensitive information may be unduly delayed. This is especially important in tactical networks where loss or delay may have extreme consequences.

Conventional network managers have rules for policy-based management that determine the routes that should be taken based on QoS level or DSCP value, but if those routes are congested, data is typically dropped.

SUMMARY

In one embodiment, a method includes receiving a data packet at a routing engine of a node of a network. A route is selected, from a forwarding table of the node, for sending the data packet from the node to a destination of the data packet. The forwarding table includes route characteristics, including route costs, related to two or more routes from the node to the destination. The selected route is analyzed, by a computer hardware computing device, to determine whether the selected route is suitable to convey the data packet based on real-time network traffic. The data packet is returned to the routing engine of the node if the selected route is determined to be unsuitable to convey the data packet. An alternate route is selected, from the forwarding table, for the data packet in place of the previous selected route if the previous selected route is determined to be unsuitable to convey the data packet.

In another embodiment, a system includes a node of a network, where the node includes a routing engine and a traffic shaper associated with an outbound interface of the routing engine. The routing engine is configured to receive a data packet; and to select, from a forwarding table of the node, a route for sending the data packet from the node to a destination of the data packet. The forwarding table includes route characteristics, including route costs, related to two or more routes from the node to the destination. The traffic shaper is configured to analyze, by a hardware computing device, the selected route to determine whether the selected route is suitable to convey the data packet based on real-time traffic information. The traffic shaper is further configured to return the data packet to the routing engine of the node if the selected route is determined to be unsuitable to convey the data packet. The routing engine is further configured to select, from the forwarding table, an alternate route for the data packet in place of the previous selected route if the previous selected route is determined to be unsuitable to convey the data packet.

In yet another embodiment, a computer program product includes a computer readable storage medium having computer readable program code embodied thereon. The computer readable program code is executable by a processor to perform a method. The method includes receiving a data packet at a routing engine of a node of a network. A route is selected, from a forwarding table of the node, for sending the data packet from the node to a destination of the data packet. The forwarding table includes route characteristics, including route costs, related to two or more routes from the node to the destination. The selected route is analyzed, by a computer hardware computing device, to determine whether the selected route is suitable to convey the data packet based on real-time network traffic. The data packet is returned to the routing engine of the node if the selected route is determined to be unsuitable to convey the data packet. An alternate route is selected, from the forwarding table, for the data packet in place of the previous selected route if the previous selected route is determined to be unsuitable to convey the data packet.

Additional features and advantages are realized through the techniques of this disclosure. Other embodiments and aspects of the disclosure are described in detail herein and are considered a part of the claims. For a better understanding of the disclosure with its advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

According to some embodiments of the present routing system, data packets may be rerouted instead of dropped due to congestion, i.e., link saturation, or other traffic shaping concerns. Generally, the routing system may identify that a chosen "best" route is experiencing link saturation or other issues, dynamically identify one or more viable alternate routes for the data, and make use of at least one of those alternate routes. Thus, instead of dropping the packet, the routing system may dynamically use alternate routes, possibly at different but compatible QoS levels, toward the destination of the data packet.

The routing system may leverage other identified valid routes, selecting from them, for example, based on desired destination address, QoS, and DSCP marking. If such an alternate route exists, the routing system may forward the packet along that route instead of the route that would have caused the packet to be dropped. Various embodiments of the routing system may prevent the need to drop packets in case of congestion or traffic shaping concerns, improve utilization of the overall network, and thereby decrease the need for retransmissions. Because embodiments of the present routing system may dynamically select routes, such embodiments can therefore make more efficient use of dynamic networks.

Figure 1:
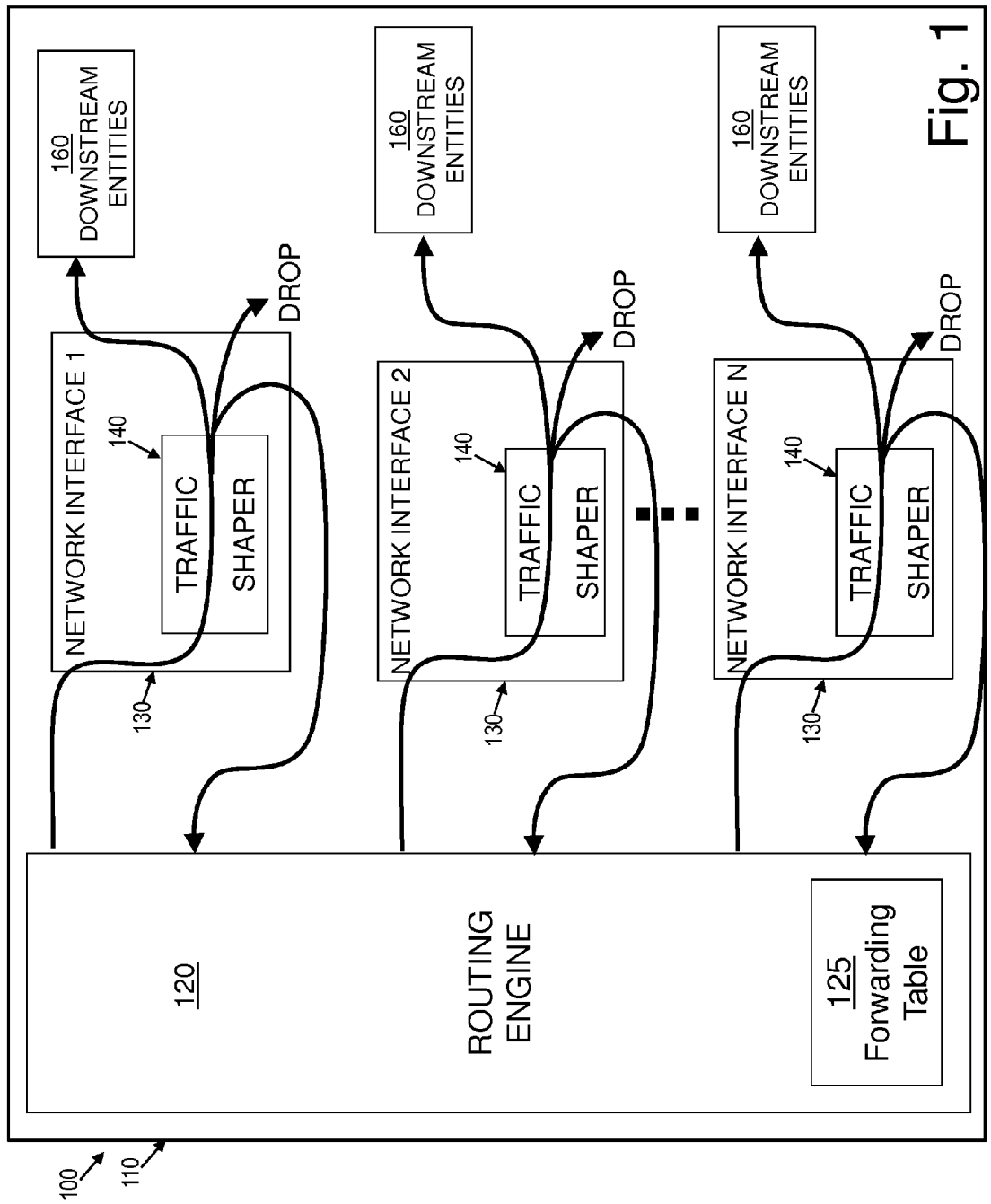
FIG. 1 is a block diagram of a node of a routing system, according to some embodiments of this disclosure.

FIG. 1 is a block diagram of at least a portion of a node 110 of a network, where the node incorporates aspects of a routing system 100 according to some embodiments of this disclosure. The node 110 may be a routing node for a network being managed by the routing system 100. It will be understood that the node 110 may include other components than those shown. The network may include one or more of such nodes 110, which together may route data packets across the network. As shown, the node 110 may include a routing engine 120 and one or more network interfaces 130. Each network interface 130 may include a traffic shaper 140 connected to one or more downstream entities 160 (e.g., weighed fair queues). Although multiple network interfaces 130 are shown in FIG. 1, it may be the case that only two network interfaces 130 are included in a single node 110. Each downstream entity 160 may include an interface to a corresponding physical link connecting the current node 110 to an adjacent node 110.

A data packet may be received at a node 110 from an adjacent node, through one of the node's network interfaces 130, which in that case acts as an entrance interface. In contrast, when a data packet is sent from a node 110 through a particular network interface 130, that network interface 130 then acts as an exit interface.

The routing engine 120 may make routing decisions for each data packet received at the node 110. More specifically, the routing engine 120 may determine whether the route deemed most appropriate for the data packet, via traditional policy determinations, is unsuitable to handle the data packet, due to congestion or other reasons. In that case, the routing engine 120 may select a best alternate route for the data packet.

According to conventional routing techniques, the routing engine of a node maintains a forwarding table, indicating the best routes to each destination of which the routing engine is aware. Multiple best routes to a destination may be maintained if those are of equal cost or the cost difference is within a pre-defined threshold. Data stored in the forwarding table is established through communication with adjacent nodes, which in turn communicate with their adjacent nodes, and so forth. Thus, through communication among various nodes between a first node and a destination, the first node determines a best route to the destination. Further, because each node is aware of its adjacent links (i.e., connections to adjacent nodes), the various nodes are able to communicate network topology changes to one another. If a topology change or other change to the network introduces a new best route, then the first node will eventually become aware of it through communication with other nodes. In that case, the new best route will replace the previous best route in the routing engine's forwarding table.

Along with the best route, in conventional systems, the routing engine also maintains a cost of that route. Calculation of a route's cost is generally policy dependent. For example, the cost of a route as stored by a first node may be the number of hops (i.e., links between nodes) between the first node and the destination. According to conventional techniques, for each destination maintained in the forwarding table, only the best routes (i.e., the route with the lowest cost, or the routes with very similar lowest costs) are maintained in the forwarding table. All other routes are discarded and forgotten. Thus, when a data packet is received for delivery to a particular destination, according to conventional techniques, the routing engine selects the currently known best route.

In some embodiments of the routing system 100 according to this disclosure, as in the conventional art, the nodes 110 may be in communication with one another, and each node may maintain a forwarding table 125. However, the forwarding table 125 may maintain one or more routes for each known destination. When a new route is identified, that route may be added to the forwarding table 125 along with the cost of that route, but no existing known routes need be removed from the forwarding table 125. When initially selecting a best route, according to some embodiments, the routing engine 120 may select the current best route (e.g., the lowest cost route) from among those routes available to the destination, as stored in the forwarding table.

Based on the route selected, the routing engine 120 may identify a corresponding network interface 130. In some embodiments, a distinct network interface 130 may be used for each link from the current node 110, so route selection may uniquely determine the corresponding network interface associated with the first link of the selected route.

Each network interface 130 may include a traffic shaper 140 and associated downstream entities 160. The traffic shaper 140 may include one or more traffic queues. The traffic shaper 140 may place the data packet in a particular queue based on user-configurable policy. For example, and not by way of limitation, the traffic shaper 140 may use a token bucket as a traffic meter to maintain the data packet output rate, i.e., the rate limit. The various data packets on the queues may eventually be dequeued and, in some cases, sent to the downstream entities 160.

Before a packet is sent to the downstream entities (160), the traffic shaper 140 may determine whether the selected route, which begins with the link leading from that network interface 130, is suitable for conveying the data packet. If the selected route is deemed suitable, the traffic shaper 140 may send the packet to the downstream entities 160.

There may be circumstances under which the selected route is not suitable to convey a particular data packet, even when the selected route is the traditional "best" route. For example, and not by way of limitation, a data packet may need to be dropped if it is out of profile (i.e., contract) according to the user-configurable policy, or if the applicable queue is full. According to conventional techniques, in such circumstances, the data packet would be dropped, or discarded, by the traffic shaper 140 according to user-configurable policy.

The determination regarding the selected route's suitability to convey the data packet may be determined by existing policies, which may be established by a network manager and enforced by the various nodes 110 of the network. For example, and not by way of limitation, a route may be deemed unsuitable due to congestion when its utilization exceeding a predetermined threshold, such as a threshold of 80% loading on any one link of the route; due to having insufficient bandwidth to transmit the packet; or due to there being an unacceptable delay (i.e., a delay exceeding the timeframe of a predetermined threshold) between sending previous data packets to a corresponding physical interface of the downstream entities 160 and transmission of those data packets over the adjacent link. For another example, a route may be deemed unsuitable if the jitter of the route exceeds a predetermined threshold.

According to conventional techniques, the traffic shaper examines and analyzes the selected route, based on the current network policies to determine whether the selected route is currently suitable to convey the data packet (e.g., whether the data packet is in profile). If a selected route is deemed suitable for the data packet, then the traffic shaper may send the data packet to the physical interface of the downstream entities 160. The physical interface may then send the data packet along the adjacent link that corresponds to the selected route. If the selected route is not suitable, the data packet will conventionally be queued, reclassified, or dropped, according to conventional techniques.

Some embodiments of this disclosure build on conventional techniques. According to some embodiments, the traffic shaper 140 need not drop the data packet due to the selected route being unsuitable. Rather, in that case, the traffic shaper 140 may return the data packet to the routing engine 120. The routing engine 120 may then determine a best alternate route for sending the data packet toward its destination. To this end, the routing engine 120 may identify one or more alternate routes for the data packet. These alternate routes may have already been stored in the forwarding table 125, as discussed above. In some embodiments, the alternate routes identified may include all previously discovered routes leading from the current node 110 to the destination, as such routes need not have been dropped upon identification of new best routes.

According to some embodiments, the routing engine 120 may maintain in its forwarding table 125 a plurality of alternate routes toward each known destination. The routing engine 120 may also maintain various route data about the alternate routes, which data may include respective route characteristics and may be generated and maintained through communications among the various nodes of the network, as discussed above. The route data may include the route cost of the various alternate routes, which may be calculated based on various factors, such as, for example, QoS, bandwidth, latency, hop count, and jitter.

Using the route data, the routing engine 120 may select a best alternate route, after a previously selected route was deemed unsuitable for the data packet and such data packet was returned to the routing engine 120. Determining which route to select as the best alternate route may occur through use of various selection algorithms, which may consider various traffic characteristics of the alternate routes. For example, and not by way of limitation, the selection algorithm used may be QoS-aware and may consider a combination of one or more of the following, which contribute to route cost and may be obtained from the route data: QoS, DSCP marking, bandwidth, latency, hop count, and jitter. In some embodiments, the selection algorithm may also take into account the application for which the data packet is being transmitted. For example, a VoIP application will likely require a lesser degree of jitter than would be acceptable for web browsing. Thus, for a VoIP packet, the best alternate route may be required to be below a jitter threshold. For another example, the selection algorithm may simply choose the route with the highest bandwidth, or may use a round robin approach to assigning data packets to the various alternate routes toward a destination. It will be understood that various selection algorithms may be used for selecting a best alternate route from among the available alternate routes in the forwarding table 125.

In some instances, selecting a best alternate route may be contrary to, or may at least relax, existing network policies. For instance, network policies may require that data packets for a certain application be sent along a route with at least a predetermined QoS or other desired characteristics. However, such a requirement may do more harm than good when a due packet is dropped due to the initially selected best route being unsuitable. According to some embodiments, those data packets may instead be sent along a route having a slightly lower QoS, which may yield a better result than dropping the data packet. Selecting a best alternate route may therefore lead to a better result than dropping the data packet. Instead of dropping queued data when congestion would traditionally require it, the routing system 100 may adapt and send the data packet by another different route.

In some embodiments, the routing engine 120 may maintain metadata, for example, in the data packet itself or stored in the routing engine 120, indicating which network interfaces 130 have already been tried for the data packet in question. Before sending the data packet to the network interface 130 of a selected route, the routing engine 120 may check the metadata associated with the data packet to confirm that the corresponding network interface 130 was not previously attempted for the data packet. If the network interface 130 for the selected route is already listed in such metadata, then the routing engine 120 may select a different best alternate route for the data packet, excluding the route that was previously selected and determined to be already attempted. Further, the data packet will have been received at the node through one of the network interfaces 130, which in that case behaved as an entrance interface. To avoid route looping, in some embodiments, the routing engine 120 may avoid selecting the entrance interface as the outgoing network interface 130 for the data packet. In some embodiments, when sending the data packet to the network interface 130 for the selected route, the routing engine 120 may modify the data packet's associated metadata to indicate that the network interface 130 has been attempted for the data packet.

If a selected route (which may be either the initially selected best route or a best alternate route selected after a return to the routing engine 120) is deemed suitable for the data packet, then the traffic shaper 140 may send the data packet to the downstream entities 160. The physical interface of the downstream entities 160 may then send the data packet along the adjacent link that corresponds to the selected route. However, if the selected route is deemed unsuitable, the traffic shaper 140 may modify the data packet's associated metadata to indicate that this network interface 130 has already been attempted (unless the routing engine 120 already performed this task), and may then return the data packet to the routing engine 120. The routing engine 120 may then select a new best alternate route for the data packet, as discussed above.

Alternatively, in some embodiments, when the selected route is not suitable, if the traffic shaper 140 determines that a termination condition has been met, the traffic shaper 140 may drop the data packet. For example, and not by way of limitation, if the traffic shaper 140 determines, based on the data packet's associated metadata, that the data packet has already been returned to the routing engine 120 for rerouting in a prior attempt, or in a predetermined quantity of prior attempts, the traffic shaper 140 may drop the data packet instead of returning it to the routing engine 120.

Figure 2:
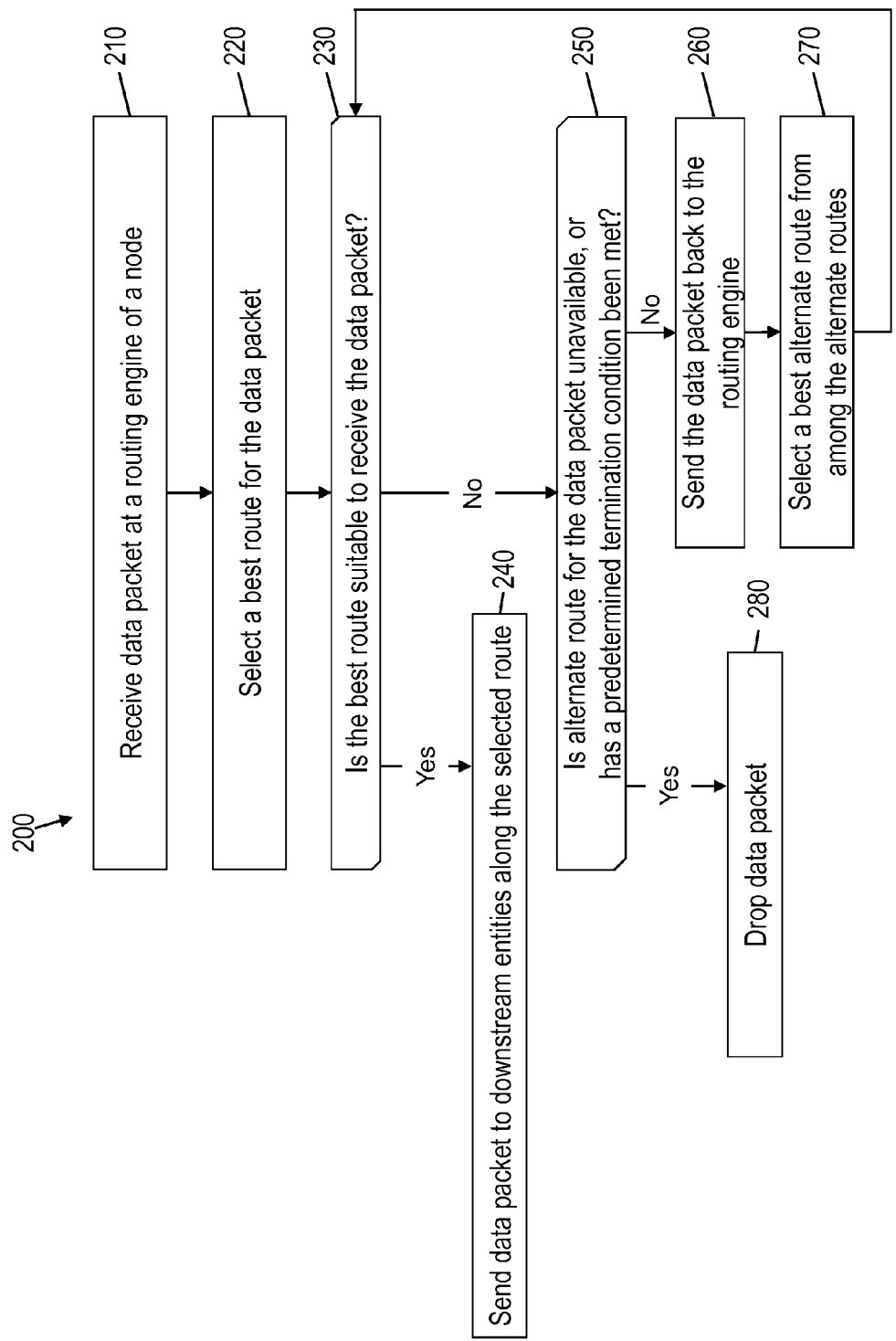
FIG. 2 is a flow diagram of a method for routing data packets in a network, according to some embodiments of this disclosure.

FIG. 2 is a flow diagram of a method 200 for routing data packets through a network, according to some embodiments of this disclosure. As shown, at block 210, a data packet may be received at a node 110. At block 220, a route may be selected for the data packet, where the route is selected from the forwarding table 125. Once the route is determined, the data packet is sent to the network interface 130 corresponding to the selected route. At decision block 230, it may be determined whether the network interface 130 of the selected route is suitable for the data packet. If the selected route is deemed suitable, the data packet is sent to the downstream entities 160 at block 240.

If the selected route is deemed unsuitable for the data packet at decision block 230, it is determined whether an alternate route is unavailable or a predetermined termination condition has been met at decision block 250. If either an alternate route is unavailable or a predetermined termination condition has been met at decision block 250, then the data packet is dropped at block 280. Otherwise, the data packet is sent back to the routing engine 120 at decision block 260. At block 270, an alternate route may be selected from among available alternate routes in the forwarding table 125. The method 200 then returns to decision block 230, where it is determined whether the network interface 130 of the selected alternate route is suitable for the data packet. Blocks 230 through 270 may be repeated until a suitable alternate route is found or until the data packet is dropped.

It will be understood that the above method 200 is provided for illustrative purposes only. This method 200 may be modified based on implementation or other methods may be used, according to other embodiments of this disclosure.

Thus, some embodiments of the present routing system 100 allow better utilization of a network's bandwidth, since traffic to overloaded links may be offloaded to underutilized links. As a result, the routing system 100 may reduce the need to drop data, as compared to conventional routing techniques. Further, the routing system 100 may react to topology changes before routing protocols have converged. For instance, as primary links degrade prior to a topology change, alternate links may automatically begin carrying more traffic.

Figure 3:
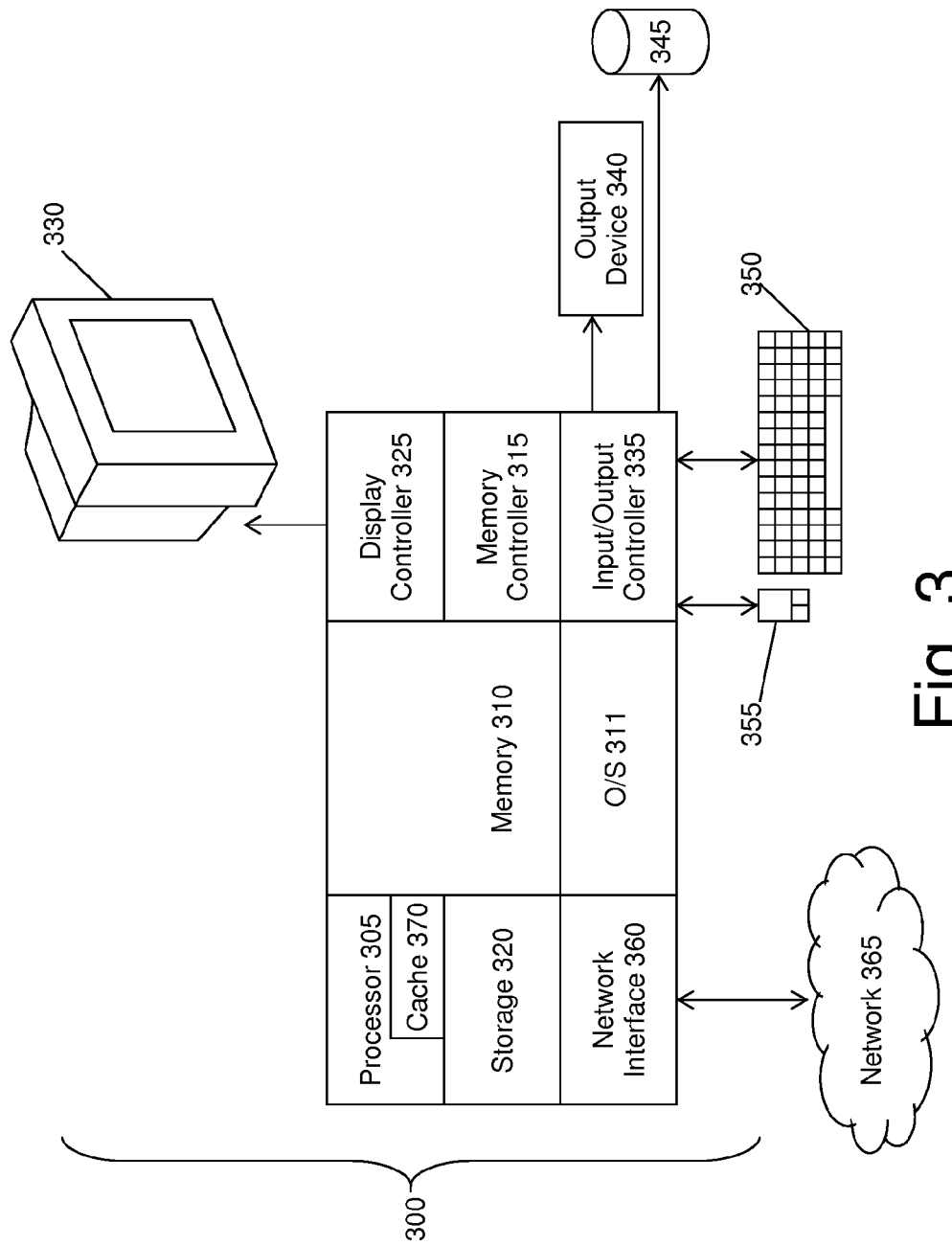
FIG. 3 is a block diagram of a computer system for implementing some or all aspects of the routing system, according to some embodiments of this disclosure.

Some embodiments of the routing system 100 may be implemented, in whole or in part, by a computer system or by computer hardware. For example, and not by way of limitation, the routing system may be implemented by field-programmable gate arrays (FPGAs), application-specific integrated circuits (ASICs), or custom logic. For another example, FIG. 3 illustrates a block diagram of a computer system 300 for use in implementing a routing system 100 or method 200 according to some embodiments. The routing systems 100 and methods 200 described herein may be implemented in hardware, software (e.g., firmware), or a combination thereof. For instance, one or more nodes 110 of the routing system 100 may be embodied in computer systems 300 such as that shown in FIG. 3.

In an exemplary embodiment, the methods described may be implemented, at least in part, in hardware and may be part of the microprocessor of a special or general-purpose computer system 300, such as a personal computer, workstation, minicomputer, or mainframe computer.

In an exemplary embodiment, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. A conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be any custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the routing systems 100 and methods 200 of this disclosure.

The computer system 300 may further include a display controller 325 coupled to a display 330. In an exemplary embodiment, the computer system 300 may further include a network interface 360 for coupling to a network 365. The network 365 may be an IP-based network for communication between the computer system 300 and any external server, client and the like via a broadband connection. The network 365 transmits and receives data between the computer system 300 and external systems. In an exemplary embodiment, the network 365 may be a managed IP network administered by a service provider. The network 365 may be implemented in a wireless fashion, e.g., using wireless protocols and technologies, such as Wi-Fi, WiMAX, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Routing systems 100 and methods 200 according to this disclosure may be embodied, in whole or in part, in computer program products or in computer systems 300, such as that illustrated in FIG. 3.

The corresponding structures, materials, acts, and equivalents of all means or step plus function elements in the claims below are intended to include any structure, material, or act for performing the function in combination with other claimed elements as specifically claimed. The description herein has been presented for purposes of illustration but is not intended to be exhaustive or limited to the embodiments specifically described. Many modifications and variations will be apparent to those of ordinary skill in the art without departing from the scope and spirit of this disclosure. The embodiments were chosen and described in order to best explain the principles of the various embodiments and the practical applications, and to enable others of ordinary skill in the art to understand the various embodiments with various modifications as are suited to the particular uses contemplated.

While some embodiments have been described, it will be understood that those skilled in the art, both now and in the future, may make various improvements and enhancements that fall within the scope of the claims which follow. These claims should be construed to maintain the proper protection for this disclosure.

What is claimed is:

1. A method comprising:
receiving a data packet at a routing engine of a node of a network;
selecting, from a forwarding table of the node, a route for sending the data packet from the node to a destination of the data packet, wherein the forwarding table comprises route characteristics, comprising route costs, related to two or more routes from the node to the destination;
analyzing, by a hardware computing device, the selected route to determine whether the selected route is suitable to convey the data packet based on real-time traffic information;
returning the data packet to the routing engine of the node after modifying metadata of the data packet if the selected route is determined to be unsuitable to convey the data packet, the metadata being modified to indicate that the selected route is determined to be unsuitable to convey the data packet;
determining whether an alternate route from the forwarding table meets existing network policies for route selection by determining whether a set of route characteristics of the alternate route meets the existing network policies for an application associated with the data packet;
in response to determining that the alternate route does not meet existing network policies for route selection through determining that the set of route characteristics of the alternate route does not meet the existing network policies for the application, determining whether the data packet is to be dropped if the alternate route is not selected;
in response to determining that the data packet is to be dropped if the alternate route is not selected, determining whether selection of the alternate route yields a better result than dropping the data packet;
in response to determining that selection of the alternate route yields a better result than dropping the data packet, relaxing the existing network policies to permit selection of the alternate route even if contrary to the existing network policies; and
selecting, from the forwarding table, the alternate route for the data packet in place of the previous selected route if the previous selected route is determined to be unsuitable to convey the data packet and relaxation of the existing network policies.

2. The method of claim 1, further comprising:
repeating the analyzing the selected route to determine whether the selected route is suitable to convey the data packet and the selecting an alternate route for the data packet in place of the previous selected route, until the selected alternate route is deemed suitable to convey the data packet; and
transmitting the data packet along the selected alternate route after the selected alternate route is deemed suitable to convey the data packet.

3. The method of claim 1, further comprising:
repeating the analyzing the selected route to determine whether the selected route is suitable to convey the data packet and the selecting an alternate route for the data packet in place of the previous selected route, until a termination condition is met; and
dropping the data packet after the termination condition is met.

4. The method of claim 3, wherein the termination condition is dependent on a number of times the data packet has already been returned to the routing engine for rerouting as indicated by the metadata.

5. The method of claim 4, wherein the termination condition occurs if the data packet has been returned to the routing engine for rerouting once.

6. The method of claim 1, wherein the metadata indicates which routes from the node to the destination have been analyzed for suitability to convey the data packet.

7. The method of claim 1, wherein selecting the selected alternate route for the data packet comprises:
identifying, in the forwarding table, two or more alternate routes from the node to the destination;
comparing the route characteristics of the two or more alternate routes; and
selecting the selected alternate route from among the two or more alternate routes based at least in part on the route characteristics.

8. The method of claim 7, wherein comparing route characteristics of the two or more alternate routes comprises comparing a quality of service along the two or more alternate routes.

9. The method of claim 7, wherein comparing the route characteristics of the two or more alternate routes is performed based at least in part on an application for which the data packet is being transmitted such that selection of the alternate route for different applications is able to be based on different combinations of traffic characteristics.

10. The method of claim 1, wherein:
the method further comprises modifying the metadata to include previously selected routes, and analyzing the selected route comprises:
determining whether, based on the metadata, the selected route is a previously selected route, and
in response to determining that the selected route is a previously selected route, excluding selection of the selected route.

11. The method of claim 1, wherein:
selection of the alternate route is further based on a Differentiated Services Code Point (DSCP) marking of the packet.

12. The method of claim 1, wherein:
selection of the alternate route is further based on a combination of Quality of Service (QoS) provided by the alternate route, Differentiated Services Code Point (DSCP) marking of the packet, bandwidth provided by the alternate route, latency caused by the alternate route, hop count when the alternate route is used, and jitter associated with the alternate route.

13. The method of claim 1, wherein:
the set of route characteristics of the previous selected route meets the existing network policies for the application associated with the data packet,
the set of route characteristics comprise Quality of Service (QoS), and
the determining that the alternate route does not meet existing network policies for route selection comprises determining that the alternate route has a lower QoS than a minimum QoS for the application.

14. A system comprising:
a node of a network, the node comprising:
   a routing engine configured to receive a data packet, and to select, from a forwarding table of the node, a route for sending the data packet from the node to a destination of the data packet, wherein the forwarding table comprises route characteristics, comprising route costs, related to two or more routes from the node to the destination; and
   a traffic shaper associated with an outbound interface of the routing engine, wherein the traffic shaper is configured to:
   analyze, by a hardware computing device, the selected route to determine whether the selected route is suitable to convey the data packet based on real-time traffic information; and
   return the data packet to the routing engine of the node after metadata of the data packet is modified if the selected route is determined to be unsuitable to convey the data packet, the metadata being modified to indicate that the selected route is determined to be unsuitable to convey the data packet;
wherein the routing engine is further configured to:
   determine whether an alternate route from the forwarding table meets existing network policies for route selection by determining whether a set of route characteristics of the alternate route meets the existing network policies for an application associated with the data packet;
   in response to a determination that the alternate route does not meet existing network policies for route selection through a determination that the set of route characteristics of the alternate route does not meet the existing network policies for the application, determine whether the data packet is to be dropped if the alternate route is not selected;
   in response to a determination that the data packet is to be dropped if the alternate route is not selected, determine whether selection of the alternate route yields a better result than dropping the data packet;
   in response to a determination that selection of the alternate route yields a better result than dropping the data packet, relax the existing network policies to permit selection of the alternate route even if contrary to the existing network policies; and
   select, from the forwarding table, the alternate route for the data packet in place of the previous selected route if the previous selected route is determined to be unsuitable to convey the data packet.

15. The system of claim 14, wherein the traffic shaper is configured to repeatedly analyze the selected route to determine whether the selected route is suitable to convey the data packet and the routing engine is configured to repeatedly select an alternate route for the data packet in place of the previous selected route, until the selected alternate route is deemed suitable to convey the data packet; and
wherein the node further comprises a network interface configured to transmit the data packet along the selected alternate route after the selected alternate route is deemed suitable to convey the data packet.

16. The system of claim 14, wherein the traffic shaper is configured to repeatedly analyze the selected route to determine whether the selected route is suitable to convey the data packet and the routing engine is configured to repeatedly select an alternate route for the data packet in place of the previous selected route, until a termination condition is met; and
wherein the traffic shaper is further configured to drop the data packet after the termination condition is met.

17. The system of claim 14, wherein the metadata indicates which routes from the node to the destination have been analyzed for suitability to convey the data packet.

18. The system of claim 14, wherein routing engine is configured to select the selected alternate route for the data packet by:
   identifying, in the forwarding table, two or more alternate routes from the node to the destination;
   comparing the route characteristics of the two or more alternate routes; and
   selecting the selected alternate route from among the two or more alternate routes based at least in part on the route characteristics.

19. The system of claim 18, wherein comparing route characteristics of the two or more alternate routes comprises comparing a quality of service along the two or more alternate routes.

20. The system of claim 18, wherein comparing the route characteristics of the two or more alternate routes is performed based at least in part on an application for which the data packet is being transmitted such that selection of the alternate route for different applications is able to be based on different combinations of traffic characteristics.

21. A computer program product comprising a computer readable storage medium having computer readable program code embodied thereon, the computer readable program code executable by a processor to cause the processor to:
   receive a data packet at a node of a network;
   select, from a forwarding table of the node, a route for sending the data packet from the node to a destination of the data packet, wherein the forwarding table comprises route characteristics, comprising route costs, related to two or more routes from the node to the destination;
   analyze the selected route to determine whether the selected route is suitable to convey the data packet based on real-time traffic information;
   return the data packet to the routing engine of the node after modifying metadata of the data packet if the selected route is determined to be unsuitable to convey the data packet, the metadata being modified to indicate that the selected route is determined to be unsuitable to convey the data packet;
   determine whether an alternate route from the forwarding table meets existing network policies for route selection by determining whether a set of route characteristics of the alternate route meets the existing network policies for an application associated with the data packet;

in response to a determination that the alternate route does not meet existing network policies for route selection through a determination that the set of route characteristics of the alternate route does not meet the existing network policies for the application, determine whether the data packet is to be dropped if the alternate route is not selected;

in response to a determination that the data packet is to be dropped if the alternate route is not selected, determine whether selection of the alternate route yields a better result than dropping the data packet;

in response to a determination that selection of the alternate route yields a better result than dropping the data packet, relax the existing network policies to permit selection of the alternate route even if contrary to the existing network policies; and select, from the forwarding table, the alternate route for the data packet in place of the previous selected route if the previous selected route is determined to be unsuitable to convey the data packet.

22. The computer program product of claim 21, the computer readable program code executable by a processor to further cause the processor to:

repeat the analyzing the selected route to determine whether the selected route is suitable to convey the data packet and the selecting an alternate route for the data packet in place of the previous selected route, until the selected alternate route is deemed suitable to convey the data packet; and transmit the data packet along the selected alternate route after the selected alternate route is deemed suitable to convey the data packet.

23. The computer program product of claim 21, the computer readable program code executable by a processor to further cause the processor to:

repeat the analyzing the selected route to determine whether the selected route is suitable to convey the data packet and the selecting an alternate route for the data packet in place of the previous selected route, until a termination condition is met; and drop the data packet after the termination condition is met.

24. The computer program product of claim 21, wherein the metadata indicates which routes from the node to the destination have been analyzed for suitability to convey the data packet.

25. The computer program product of claim 21, wherein selection of the selected alternate route for the data packet comprises:

identifying, in the forwarding table, two or more alternate routes from the node to the destination;

comparing the route characteristics of the two or more alternate routes; and selecting the selected alternate route from among the two or more alternate routes based at least in part on the route characteristics.

26. The computer program product of claim 25, wherein a comparison of route characteristics of the two or more alternate routes comprises comparing a quality of service along the two or more alternate routes.

* * * * *